United States Patent [19]

Matsumoto et al.

[11] Patent Number: 5,775,661
[45] Date of Patent: Jul. 7, 1998

[54] SEAT LIFTER FOR MOTOR VEHICLES

[75] Inventors: Tadashi Matsumoto; Eiichi Kawai, both of Hamamatsu, Japan

[73] Assignee: Fuji Kiko Co., Ltd., Tokyo, Japan

[21] Appl. No.: 676,730

[22] Filed: Jul. 8, 1996

[30] Foreign Application Priority Data

Jul. 6, 1995 [JP] Japan ................................. 7-170077
Jul. 6, 1995 [JP] Japan ................................. 7-170078

[51] Int. Cl.⁶ .................................................. F16M 13/00
[52] U.S. Cl. .................. 248/421; 248/394; 297/325; 297/330; 297/344.12
[58] Field of Search ............................... 248/421, 422, 248/157, 394, 395; 297/313, 325, 330, 344.12

[56] References Cited

U.S. PATENT DOCUMENTS

| | | | |
|---|---|---|---|
| 4,159,095 | 6/1979 | Pallant et al. | 248/396 |
| 4,556,185 | 12/1985 | Takagi | 248/421 |
| 4,720,070 | 1/1988 | Nishino | 248/421 X |
| 4,765,582 | 8/1988 | Babbs | 248/394 |
| 4,767,156 | 8/1988 | Yamada et al. | 297/313 |
| 5,199,679 | 4/1993 | Nakamura et al. | 248/421 X |
| 5,203,532 | 4/1993 | Matsuura | 248/421 X |

FOREIGN PATENT DOCUMENTS

| | | |
|---|---|---|
| 0 116 965 | 2/1984 | European Pat. Off. |
| 0 421 301 | 9/1990 | European Pat. Off. |
| 0 714 805 | 6/1996 | European Pat. Off. |
| 1-144240 | 10/1989 | Japan. |
| 2-15743 | 4/1990 | Japan. |

*Primary Examiner*—Laurie K. Cranmer
*Attorney, Agent, or Firm*—Foley & Lardner

[57] ABSTRACT

A seat lifter comprises a lifter shaft having a sector gear and rotated by a center gear to vertically move a seat frame with respect to a base frame through a link mechanism. The sector gear is formed with a stopper arm protruding from one side thereof, whereas the base frame is formed with a long arc-shaped hole with which a pointed end of the stopper arm is engaged. The long arc-shaped hole is partly covered by a vertical wall of the second frame.

12 Claims, 6 Drawing Sheets

SEAT LIFTER FOR MOTOR VEHICLES

BACKGROUND OF THE INVENTION

The present invention relates to a seat lifter for a vehicular seat device.

The seat lifter is a device that serves to vertically move a front part or rear part of a seat cushion to adjust an eye point and an angle of bend of knees of a driver's seat occupant.

As disclosed, for example, in JP-U 1-144240, the seat lifter comprises fundamentally a lifter shaft rotatably arranged through a shaft hole formed in one of a base frame on the stationary side and a seat frame on the movable side to vertically move the seat frame with respect to the base frame through a link mechanism, a sector gear fixed to the lifter shaft, and a center gear supported to the frame to which the lifter shaft is mounted, and meshed with the sector gear to be driven by a driving mechanism, wherein a mesh retaining portion for preventing a disengagement of the sector gear is formed in the vicinity of a support portion of the center gear in such a way as to cover a side face of a meshed portion of the sector gear and center gear.

The sector gear and center gear constitute the most important drive mechanism for vertically moving the seat frame. The center gear carries out a full rotation, whereas the sector gear only needs to carry out a rotation by a predetermined angle. For preventing a disengagement of the sector gear from the center gear when rotating over the predetermined angle, the sector gear is formed with stoppers at both sides thereof, with which a tooth portion of the center gear comes in contact.

However, forming of the stoppers to the sector gear needs, upon assembling, to mesh the center gear with the sector gear, then, rotate the sector gear in a predetermined state to assemble a link, etc., having bad assembling performance, resulting in lowered work efficiency.

An improved assembling performance can be obtained by arranging, after assembling, a rotation stop between the sector gear and a bracket for rotatably supporting it without forming the stoppers to the sector gear. The rotation stop is in the form of, e.g., a screw, a pin, and an embossment which makes setting difficult, and causes an increase in assembling process and cost due to increased number of parts.

Moreover, as for the coupling structure between the sector gear and the lifter shaft, when inserting the sector gear into an end of a pipe, which constitutes the lifter shaft, a positioning jig or a collar is mounted to define a fixed position, then, welding is carried out, so that a position of the sector gear is apt to be displaced with respect to the lifter shaft, resulting in a necessity of paying full attention to quality control.

It is, therefore, an object of the present invention to provide a seat lifter for motor vehicles that enables an improvement of the assembling performance, and a cost reduction.

SUMMARY OF THE INVENTION

According to one aspect of the present invention, there is provided a seat lifter, comprising:

first and second frames;

a shaft arranged through a hole formed in one of said first and second frames, said shaft serving to vertically move said second frame with respect to said first frame through a link;

means for defining a predetermined hole in said first frame, said defining means being partly covered with said second frame;

a sector gear engaged with said shaft, said sector gear being formed with a stopper arm protruding from one side of said sector gear, said stopper arm having an end engaged with said defining means; and a center gear supported to said one of first and second frames, said center gear being meshed with said sector gear.

Another aspect of the present invention lies in providing a seat lifter, comprising:

first and second frames;

a shaft arranged through a hole formed in one of said first and second frames, said shaft serving to vertically move said second frame with respect to said first frame through a link;

a sector gear engaged with said shaft, said sector gear having a tooth portion formed in a special theoretical tooth profile; and a center gear supported to said one of first and second frames, said center gear having a tooth portion formed in a special theoretical tooth profile, said center gear being meshed with said sector gear.

DETAILED DESCRIPTION OF THE INVENTION

Referring to the drawings, a description will be made with regard to preferred embodiments of a seat lifter for motor vehicles according to the present invention.

Figure 1:
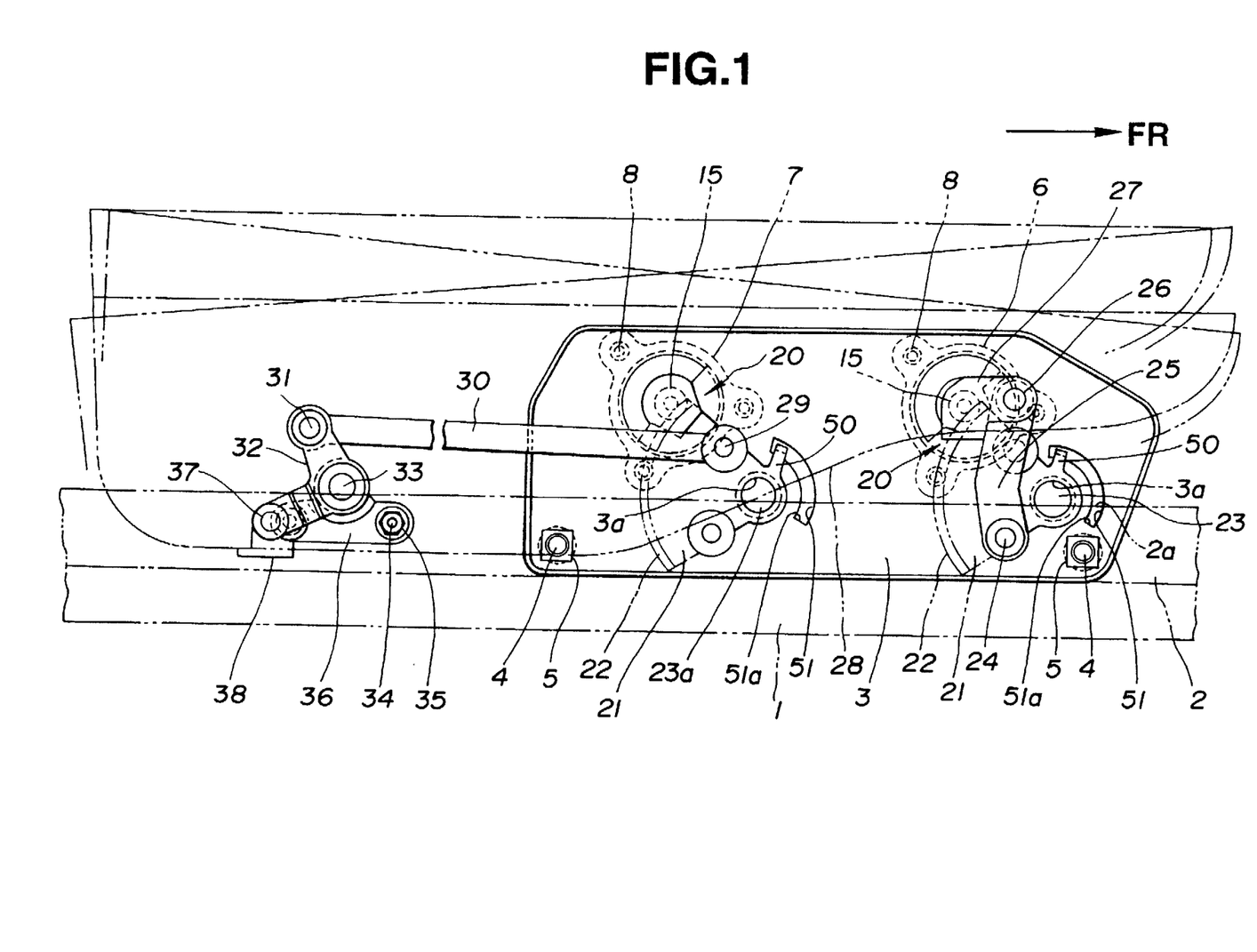
FIG. 1 is a front view as viewed taken along an arrow A in FIG. 2, showing a first preferred embodiment of a seat lifter according to the present invention.
Figure 2:
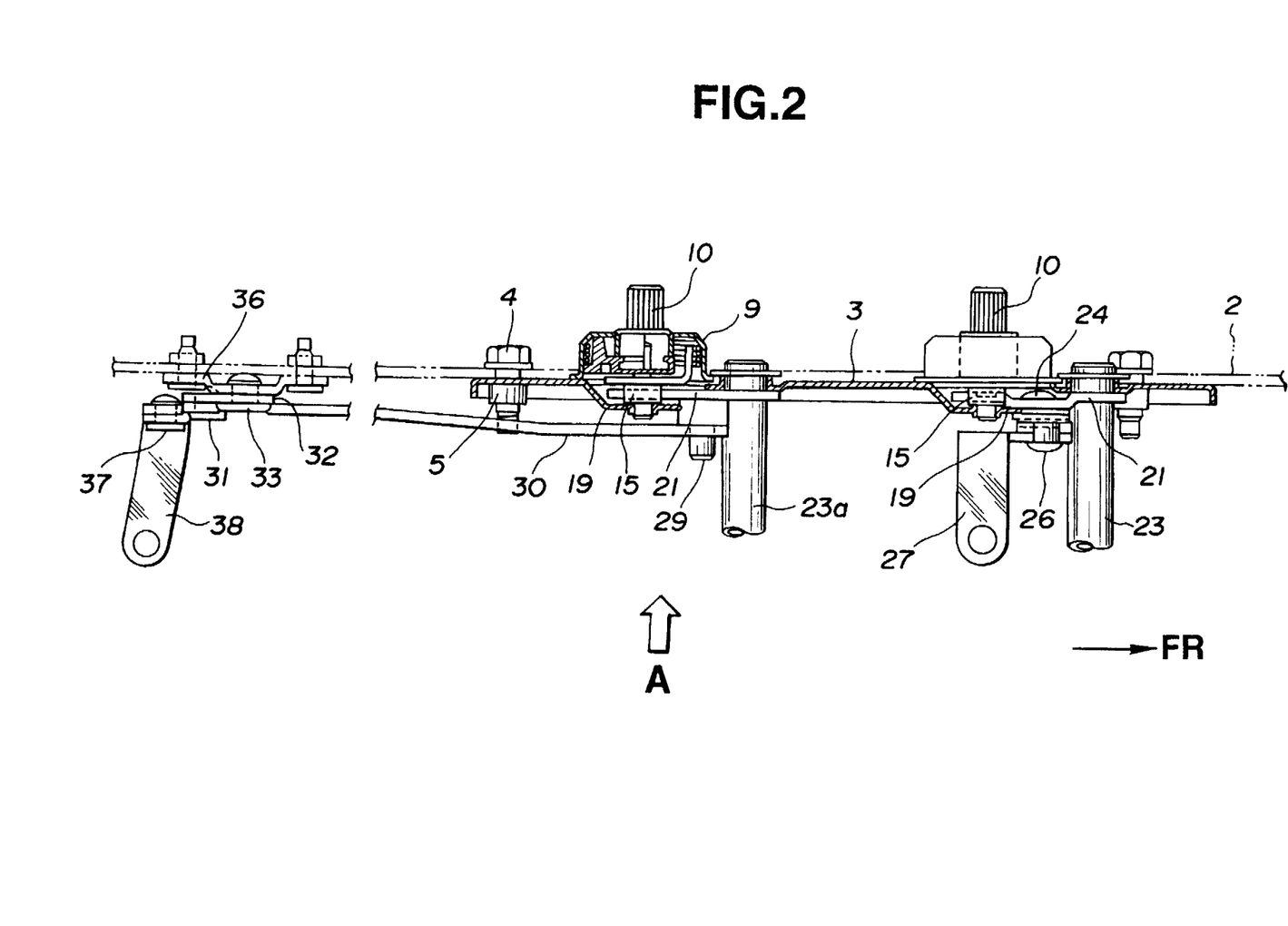
FIG. 2 is a plan view, partly section, showing the seat lifter.

FIGS. 1–7 show a first embodiment of the present invention. Referring first to FIGS. 1 and 2, a seat slide device fixed to a vehicle body comprises a lower rail 1 and an upper rail 2 engaged with the lower rail 1 and arranged to be slidable in the longitudinal direction thereof. The upper rail 2 has a vertical wall having one side to which a bracket or base frame 3 is vertically connected through a bolt and nut 4, 5, etc. A pair of speed reducers 6, 7 are fixed to one side face of the bracket 3 through caulked portions 8. The right speed reducer 6 as viewed in FIG. 1 serves to vertically move a front part of a seat cushion, whereas the left speed reducer 7 as viewed in FIG. 1 serves to vertically move a rear part of the seat cushion.

Figure 3:
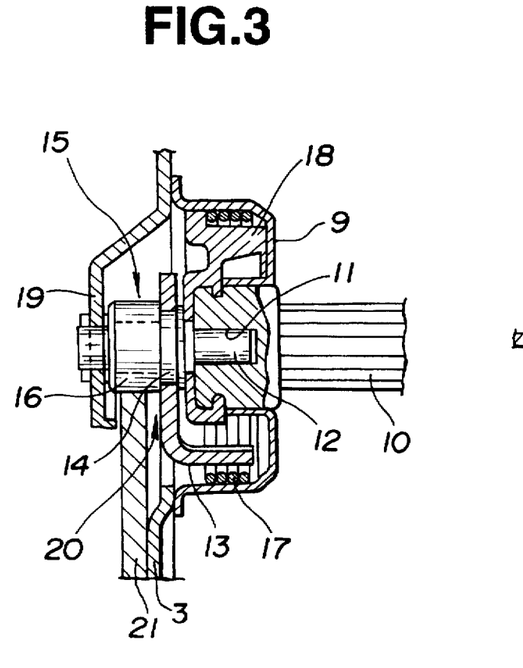
FIG. 3 is a sectional view showing a speed reducer.

Referring to FIG. 3, the speed reducers 6, 7 have a known structure provided with a brake mechanism. Each speed reducer 6, 7 comprises a casing 9 fixed to the bracket 3, a drive shaft 10 to which an electric motor, an operation knob, etc., are mounted. The drive shaft 10 has an end inserted in the casing 9. A round hole 11 is axially formed in the end of the drive shaft 10 to which a center gear 15 is connected. The gear 15 is made of a sintered metal or the like and comprises a shank 12 arranged through the round hole 11, an engaged portion 14 with a modified cross-section engaged with a brake lever 13, and a tooth portion 16. A coil spring 17 is accommodated in the casing 9, and has one end engaged with the brake lever 13 and another end engaged with a core 18.

The center gear 15 is supported to a mesh retaining portion 19 of the bracket 3 so that the tooth portion 16 thereof is exposed from an arc-shaped opening 20. A sector gear 21 having a tooth portion 22 meshed with the tooth portion 16 as exposed is rotatably supported to the bracket 3 through a lifter shaft 23, 23a. The sector gear 21 is perpendicularly connected to an end of the lifter shaft 23, 23a, which is rotatably arranged through a shaft hole 3a of the bracket 3.

Figure 4:
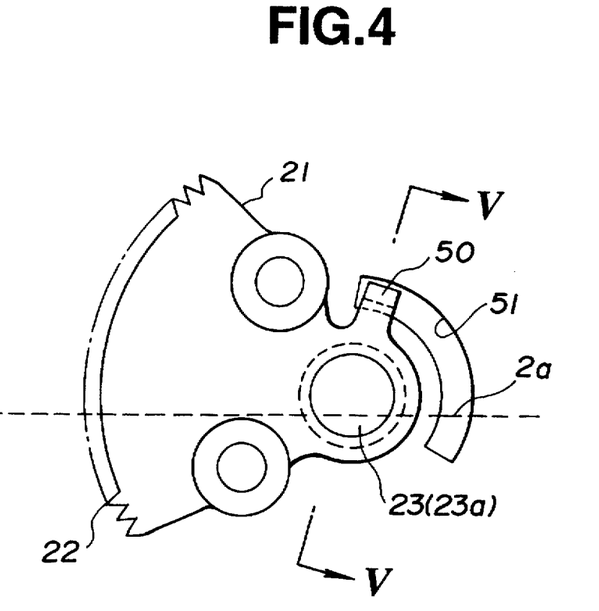
FIG. 4 is a fragmentary front view of FIG. 1.
Figure 5:
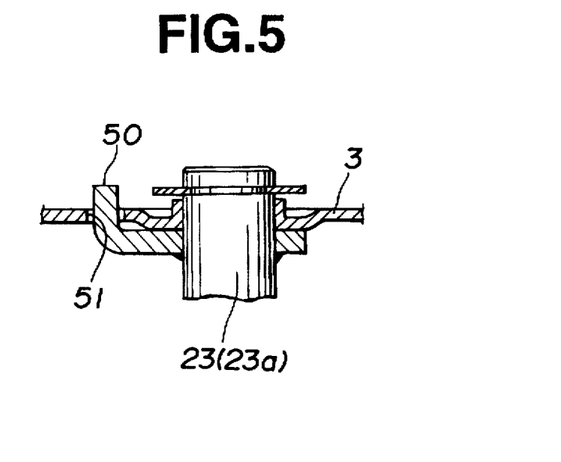
FIG. 5 is a view similar to FIG. 3, taken along the line V—V in FIG. 4.

Referring to FIGS. 1 and 4, in order to avoid assembling with the tooth portions 16, 22 of the center gear 15 and sector gear 21 meshed with each other, the sector gear 21 is not formed with a stopper for the center gear 15. Moreover, referring to FIG. 5, a stopper arm 50 is integrated with the sector gear 21 and radially protrudes from one side thereof, and has a pointed end bent at right angles and inserted in a long arc-shaped hole 51 formed in the bracket 3 around the lifter shaft 23, 23a.

The long arc-shaped hole 51 is formed with an angle so that a mesh of the sector gear 21 with the center gear 15 can be released by rotating of the sector gear 21. Referring to FIG. 1, when mounting the seat lifter to the seat slide device, the seat lifter is assembled to the bracket 3 with the pointed end of the stopper arm 50 of the sector gear 21 in contact with a lower end 51a of the long arc-shaped hole 51. Then, the bracket 3 is fixed to the upper rail 2 with the pointed end of the stopper arm 50 positioned above an upper edge 2a of the upper rail 2. Subsequently, the sector gear 21 is rotated counterclockwise to mesh the tooth portions 16, 22 of the center gear 15 and sector gear 21 with each other, and partly cover a lower part of the long arc-shaped hole 51 with the vertical wall of the upper rail 2.

Thus, the pointed end of the stopper arm 50 comes in contact with the upper edge 2a of the vertical wall of the upper rail 2 and the upper end of the long arc-shaped hole 51, both of which form a stopper for the sector gear 21. That is, before fixing the bracket 3 to the upper rail 2, the sector gear 21 and the center gear 15 need not necessarily be meshed with each other, resulting in easy assembling.

The tooth portions 16, 22 of the center gear 15 and sector gear 21 are formed in a special theoretical tooth profile. Specifically, referring to FIG. 6, the tooth portion 16 of the center gear 15 includes, e.g., four teeth of a special theoretical tooth profile, whereas the tooth portion 22 of the sector gear 21 on the driven side and meshed therewith includes, e.g., forty teeth of a special theoretical tooth profile. Such special theoretical spur gear is a gear characterized in that a curvature of a tooth curve is periodically increased and decreased in the direction of the tooth height and forms a continuous and differentiable function, and known from JP-B2 2-15743.

Figure 6:
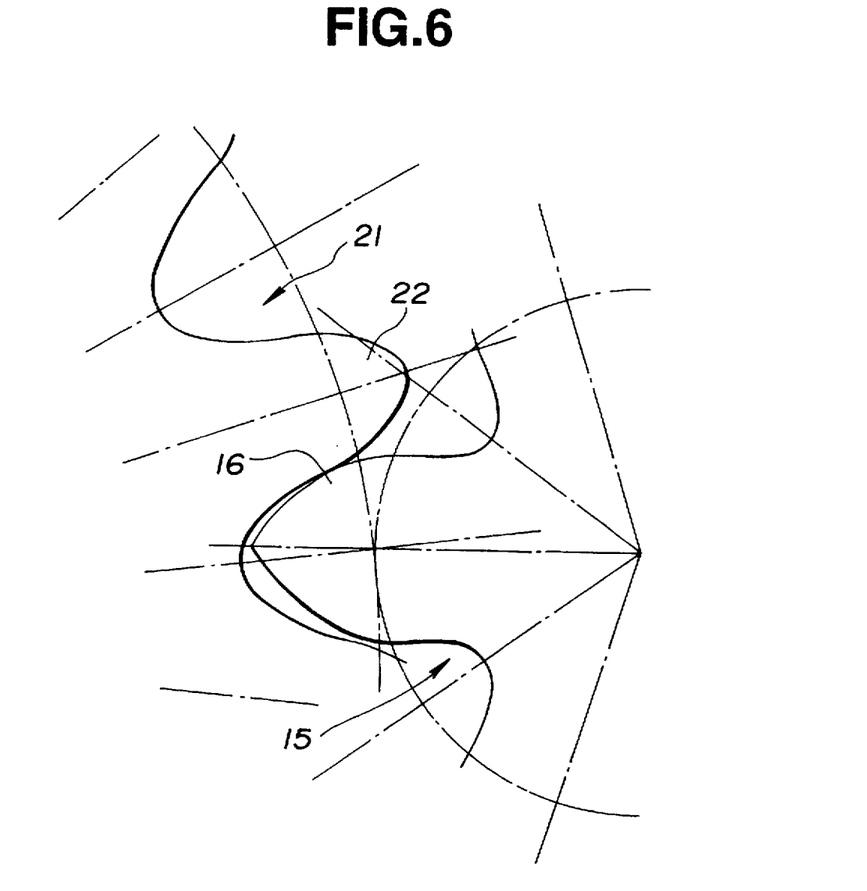
FIG. 6 is a schematic view showing a special theoretical tooth profile of a center gear and a sector gear.

As for the center gear 15, a center gear with an involute tooth profile should be formed with at least six teeth, whereas a center gear with a special theoretical tooth profile can be formed with at least four teeth, enabling high reduction ratio. Thus, in principle, the center gear 15 is formed with four teeth of a special theoretical tooth profile, and the ratio of the number of teeth of the center gear 15 to the sector gear 21 is determined to be 1 to 8–25.

As for the speed reducer 6 on the front side or on the right as viewed in FIG. 1, a first link 25 has one end rotatably connected to one side of the sector gear 21 through a shaft 24, and another end rotatably connected to one end of a second link 27 through a shaft 26, the second link 27 having another end fixed to a seat frame 28 by a bolt, etc.

On the other hand, as for the speed reducer 7 on the rear side or on the left as viewed in FIG. 1, a third link 30 has one end rotatably connected to one side of the sector gear 21 through a shaft 29, and another end rotatably connected to one end of a crank lever 32 through a shaft 31. The crank lever 32 has a center portion rotatably connected to a bracket 36 fixed to the vertical wall of the upper rail 2 through a shaft 33 by a bolt and nut 34, 35, etc., and another end rotatably connected to a fourth link 38 through a shaft 37, the fourth link 38 having one end fixed to the seat frame 28.

The above is a structure of the seat lifter, e.g., on the outer side of a driver's seat. A structure of the seat lifter on the inner side may be symmetrical with that on the outer side, and be ensured by a hinge device including a simple lever in place of the sector gear 21.

Figure 7:
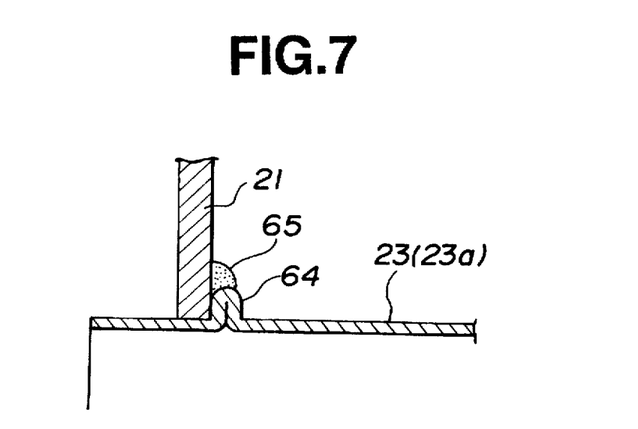
FIG. 7 is a view similar to FIG. 5, showing a connecting structure of the sector gear and a lifter shaft.

Referring to FIG. 7, as for the connecting structure of the sector gear 21 and the lifter shaft 23, 23a, the lifter shaft 23, 23a comprising a pipe is expanded outwardly at a predetermined position thereof by bulging, which is obtained through a liquid pressure applied thereto from the inside, forming the enlarged-diameter portion 64. After press-fitting the sector gear 21 to the lifter shaft 23, 23a from the end thereof, the two are integrated with each other by a weld 65 on the side of the enlarged-diameter portion 64 as shown in FIG. 7.

The operation of the seat lifter will be described. When a rotation of the knob or a drive of the electric motor causes a rotation of the drive shaft 10, the center gear 15 is rotated, so that the sector gear 21 is rotated through the tooth portion 22 thereof meshed with the tooth portion 16 of the center gear 15, and the stopper arm 50 comes in contact with the upper end of the long arc-shaped hole 51 and the upper edge 2a of the vertical wall of the upper rail 2, surely preventing a disengagement of the sector gear 21 from the center gear 15.

The above action can independently be ensured in the front and rear parts of the seat frame 28, and therefore, the seat frame 28 can be vertically moved only in the front or rear part thereof. On the other hand, if the electric motors for the front and rear parts of the seat frame 28 are driven simultaneously, the front and rear parts can be vertically moved simultaneously.

Thus, in the front part of the seat frame 28, a rotation of the first link 25 causes a rotation of the second link 27 to vertically move the seat frame 28, and a rotation of the lifter shaft 23 also produces the same action on the inner side. Likewise, in the rear part, a rotation of the third link 30 causes a rotation of the crank lever 32 around the shaft 33 to vertically move the seat frame 28, and a rotation of the lifter shaft 23a also produces the same action on the inner side.

Figure 8:
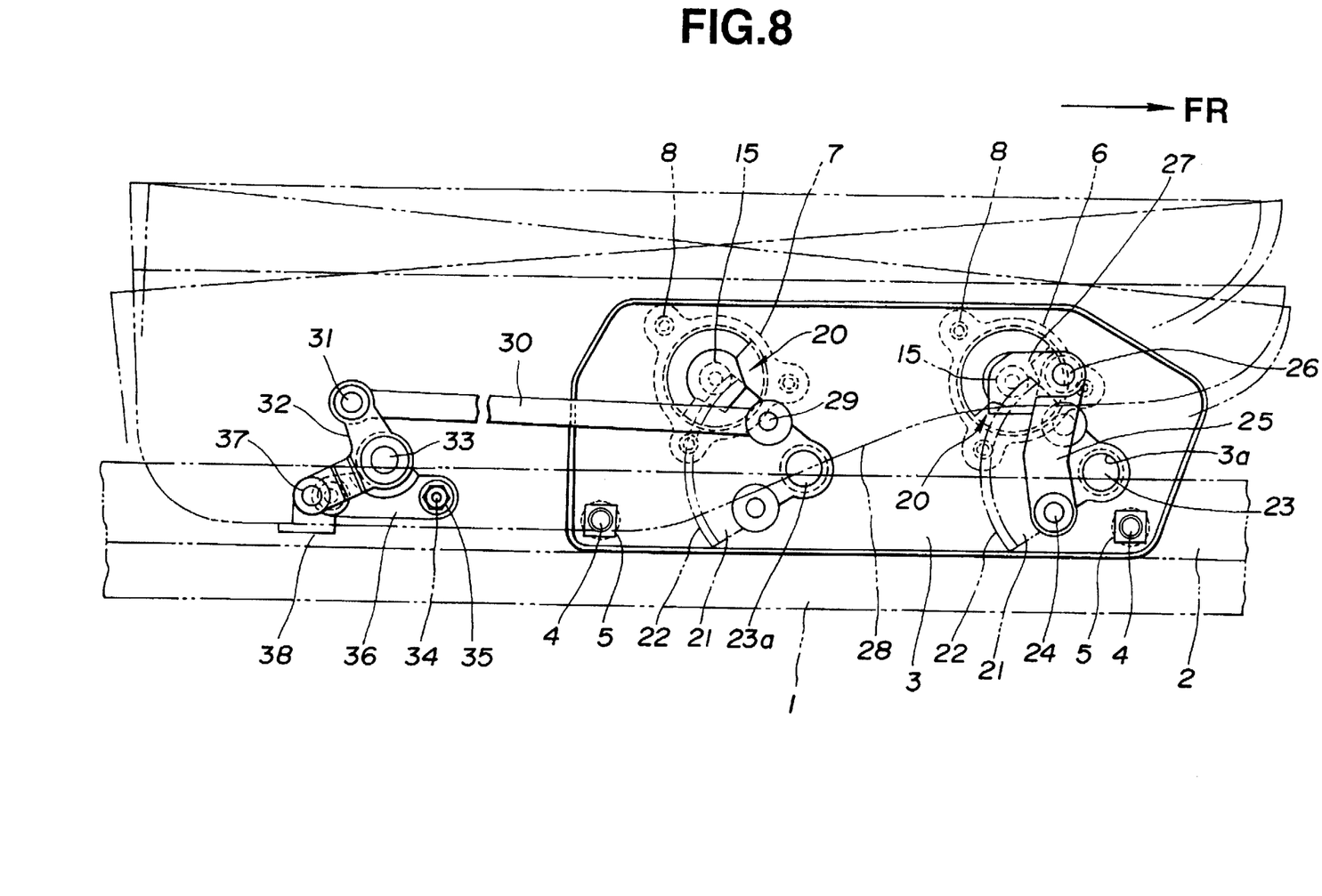
FIG. 8 is a view similar to FIG. 1, showing a second preferred embodiment of the present invention.

FIG. 8 shows a second embodiment of the present invention. Referring to FIG. 8, a seat slide device fixed to a vehicle body comprises a lower rail 1 and an upper rail 2 engaged with the lower rail 1 and arranged to be slidable in the longitudinal direction thereof. The upper rail 2 has a vertical wall having one side to which a bracket or base frame 3 is vertically connected through a bolt and nut 4, 5, etc. A pair of speed reducers 6, 7 are fixed to one side face of the bracket 3 through caulked portions 8. The right speed reducer 6 as viewed in FIG. 1 serves to vertically move a front part of a seat cushion, whereas the left speed reducer 7 as viewed in FIG. 1 serves to vertically move a rear part of the seat cushion.

Referring to FIG. 3, the speed reducers 6, 7 have a known structure provided with a brake mechanism. Each speed reducer 6, 7 comprises a casing 9 fixed to the bracket 3, a drive shaft 10 to which an electric motor, an operation knob, etc., are mounted having an end inserted in the casing 9. A round hole 11 is axially formed in the end of the drive shaft 10 to which a center gear 15 is connected. The gear 15 is made of a sintered metal or the like and comprises a shank 12 arranged through the round hole 11, an engaged portion 14 with a modified cross-section engaged with a brake lever 13, and a tooth portion 16. A coil spring 17 is accommodated in the casing 9, and has one end engaged with the brake lever 13 and another end engaged with a core 18.

The center gear 15 is supported to a mesh retaining portion 19 of the bracket 3 so that the tooth portion 16 thereof is exposed from an arc-shaped opening 20. A sector gear 21 having a tooth portion 22 meshed with the tooth portion 16 as exposed is rotatably supported to the bracket 3 through a lifter shaft 23, 23a. The sector gear 21 is perpendicularly connected to an end of the lifter shaft 23, 23a, which, is rotatably arranged through a shaft hole 3a of the bracket 3.

The tooth portions 16, 22 of the center gear 15 and sector gear 21 are formed in a special theoretical tooth profile. Specifically, referring to FIG. 6, the tooth portion 16 of the center gear 15 includes, e.g., four teeth of a special theoretical tooth profile in all, whereas the tooth portion 22 of the sector gear 21 on the driven side and meshed therewith includes, e.g., forty teeth of a special theoretical tooth profile in all. Such special theoretical spur gear is a gear characterized in that a curvature of a tooth curve is periodically increased and decreased in the direction of the tooth height and forms a continuous and differentiable function, and known from JP-B2 2-15743.

As for the center gear 15, a center gear with an involute tooth profile should be formed with at least six teeth, whereas a center gear with a special theoretical tooth profile can be formed with at least four teeth, enabling high reduction ratio. Thus, in principle, the center gear 15 is formed with four teeth of a special theoretical tooth profile, and the ratio of the number of teeth of the center gear 15 to the sector gear 21 is determined to be 1 to 8-25.

Since the tooth portions of the center gear 15 and sector gear 21 formed in a special theoretical tooth profile enable a high reduction ratio, and thus high torque, an assist spring can be eliminated, which a single reduction has been conventionally needed to reduce an operation force.

As for the speed reducer 6 on the front side or on the right as viewed in FIG. 8, a first link 25 has one end rotatably connected to one side of the sector gear 21 through a shaft 24, and another end rotatably connected to one end of a second link 27 through a shaft 26, the second link 27 having another end fixed to a seat frame 28 by a bolt, etc.

On the other hand, as for the speed reducer 7 on the rear side or on the left as viewed in FIG. 8, a third link 30 has one end rotatably connected to one side of the sector gear 21 through a shaft 29, and another end rotatably connected to one end of a crank lever 32 through a shaft 31. The crank lever 32 has a center portion rotatably connected to a bracket 36 fixed to the vertical wall of the upper rail 2 through a shaft 33 by a bolt and nut 34, 35, etc., and another end rotatably connected to a fourth link 38 through a shaft 37, the fourth link 38 having one end fixed to the seat frame 28.

The above is a structure of the seat lifter, e.g., on the outer side of a driver's seat. A structure of the seat lifter on the inner side may be symmetrical with that on the outer side, and be ensured by a hinge device including a simple lever in place of the sector gear 21.

The operation of the seat lifter will be described. When a rotation of the knob or a drive of the electric motor causes a rotation of the drive shaft 10, the center gear 15 is rotated, so that the sector gear 21 is rotated through the tooth portion 22 thereof meshed with the tooth portion 16 of the center gear 15.

The above action can be vertically ensured in the front and rear parts of the seat frame 28, and therefore, the seat frame 28 can vertically be moved only in the front or rear part thereof. On the other hand, if the electric motors for the front and rear parts of the seat frame 28 are driven simultaneously, the front and rear parts can vertically be moved simultaneously.

Thus, in the front part of the seat frame 28, a rotation of the first link 25 causes a rotation of the second link 27 to vertically move the seat frame 28, and a rotation of the lifter shaft 23 also produces the same action on the inner side. Likewise, in the rear part, a rotation of the third link 30 causes a rotation of the crank lever 32 around the shaft 33 to vertically move the seat frame 28, and a rotation of the lifter shaft 23a also produces the same action on the inner side.

Moreover, since the seat lifter having a single reduction does not include an assist spring, a dead weight of the seat frame 28 and seat cushion mounted thereon, or the sum of the dead weight and the seat occupant's weight is always loaded on the sector gears 21 through the second link 27 and first link 25, or the fourth link 38, crank lever 32 and third link 30. Thus, the lifter shafts 23, 23a, which serve as rotation centers of the sector gears 21, respectively, are pressed down to be always positioned on the bottom of the shaft holes 3a. Likewise, the shafts 24, 26, 29, 31, 37 are always in contact with one sides of respective shaft holes.

As a result, engaged portions of the lifter shafts 23, 23a, the links 25, 27, 30, 38, and the crank lever 32 have no backlash unless, when a seat cushion is occupied, a lifting force greater than the seat occupant's weight is produced. This is due to the fact that a lifting force greater than the seat occupant's weight or a force of upward 1G is not produced during normal vehicle cruising, but under abnormal conditions such as vehicle collision, etc.

Figure 9:
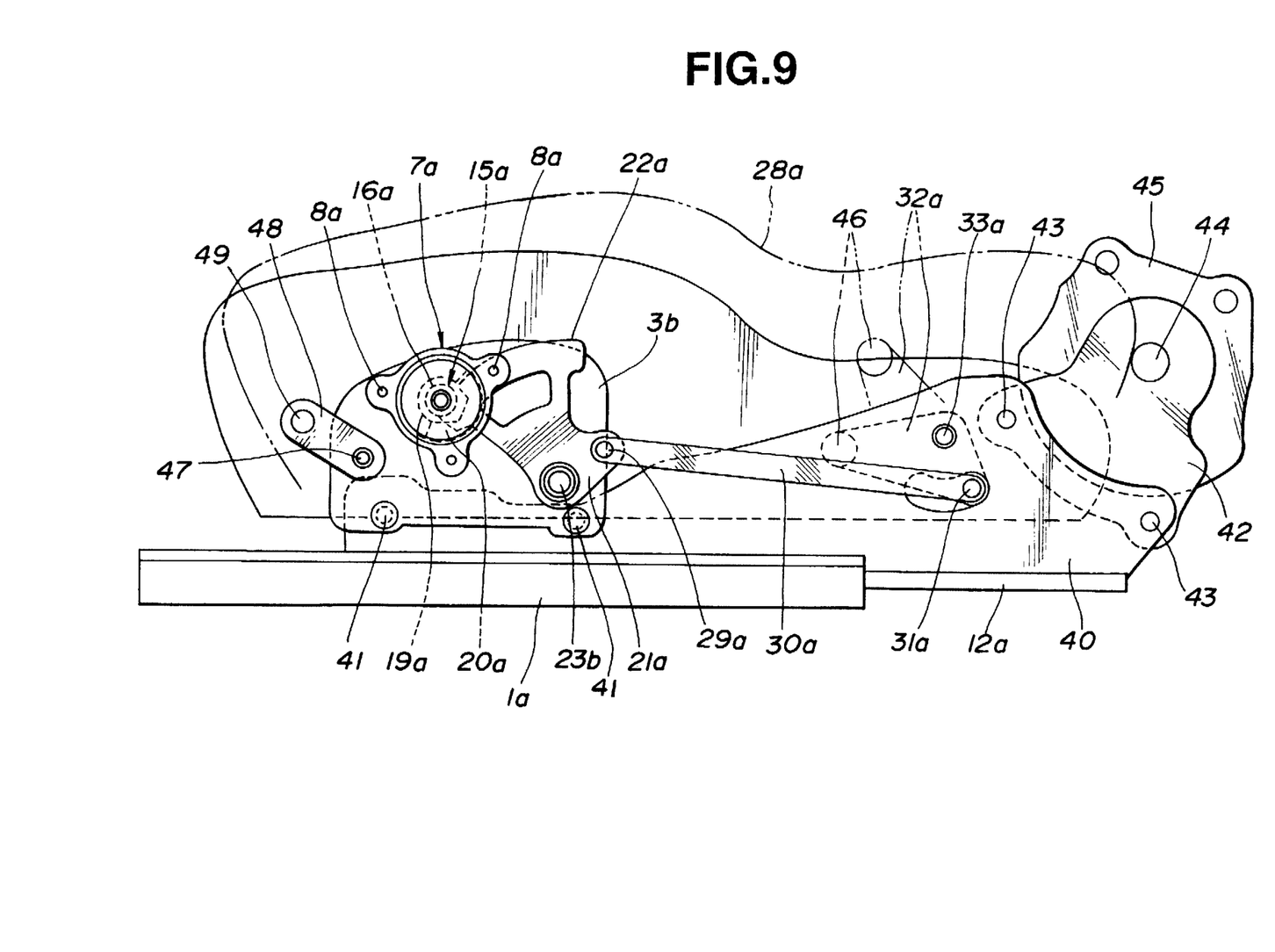
FIG. 9 is a view similar to FIG. 1, showing a third preferred embodiment of the present invention

FIG. 9 shows a third embodiment of the present invention. Referring to FIG. 9, slidably engaged with a lower rail 1a is a base plate 40 having a rail portion 12a that corresponds to an upper rail. The base plate 40 has a front end to which a bracket 3b is vertically connected through pins 41, and a rear end to which a hinge plate 42 is connected through pins 43. A tooth plate 45 is rotatably mounted to the hinge plate 42 about a center shaft 44. Connected to the tooth plate 45 is an arm, not shown, which is in turn connected to a seat back, not shown.

A speed reducer 7a is fixed to one side face of the bracket 3b through caulked portions 8a. The speed reducer 7a has substantially the same structure as that as described above. Thus, a center gear 15a is supported to a mesh retaining portion 19a of the bracket 3b so that a tooth portion 16a thereof is exposed from an arc-shaped opening 20a. A sector gear 21a having a tooth portion 22a meshed with the tooth portion 16a as exposed is rotatably supported to the bracket 3b through a lifter shaft 23b. The sector gear 21a is perpendicularly connected to an end of the lifter shaft 23b, which is rotatably arranged through a shaft hole of the bracket 3b.

The tooth portions 16a, 22a of the center gear 15a and sector gear 21a are formed in the above special theoretical tooth profile. As for the center gear 15a, a center gear with an involute tooth profile should be formed with at least six teeth, whereas a center gear with a special theoretical tooth profile can be formed with at least four teeth, enabling high reduction ratio. Thus, in principle, the center gear 15a is formed with four teeth of a special theoretical tooth profile, and the ratio of the number of teeth of the center gear 15a to the sector gear 21a is determined to be 1 to 8–25. Since the tooth portions of the center gear 15a and sector gear 21a formed in a special theoretical tooth profile enable a high reduction ratio, and thus high torque, an assist spring can be eliminated, which a single reduction has been conventionally needed to reduce an operation force.

A link 30a has one end rotatably connected to one side of the sector gear 21a through a shaft 29a, and another end rotatably connected to one end of a crank lever 32a through a shaft 31a. The crank lever 32a has a substantial center portion supported to the base plate 40 through a shaft 33a, and another end supported to a seat frame 28a through a shaft 46. A front part of the seat frame 28a is rotatably connected to a link 48 through a shaft 49, which is rotatably mounted to the bracket 3b through a shaft 47. The above is a structure of the seat lifter, e.g. on the outer side of a driver's seat. A structure of the seat lifter on the inner side may be symmetrical with that on the outer side, and be ensured by a hinge device including a simple lever in place of the sector gear 21a.

Thus, when a rotation of the knob or a drive of the electric motor causes a rotation of the drive shaft, the center gear 15a is rotated, so that the sector gear 21a is rotated through the tooth portion 22a thereof meshed with the tooth portion 16a of the center gear 15a. When the sector gear 21a is rotated counterclockwise about the lifter shaft 23b, the link 30a is drawn leftward as viewed in FIG. 9, so that the crank lever 32a is rotated clockwise about the shaft 33a to raise a rear part of the seat frame 28a. The opposite action lowers the rear part of the seat frame 28a. Therefore, the seat frame 28a can be vertically moved only in the rear part thereof.

Having described the present invention in connection with the preferred embodiment, it is noted that the present invention is not limited thereto, and various changes and modifications can be made without departing from the spirit of the present invention.

What is claimed is:

1. A seat lifter, comprising:
   first and second frames;
   a shaft arranged through a hole formed in one of said first and second frames, said shaft serving to vertically move said second frame with respect to said first frame through a link;
   means for defining a predetermined hole in said first frame, said defining means being partly covered with said second frame;
   a sector gear engaged with said shaft, said sector gear being formed with a stopper arm which protrudes from one side of said sector gear, said stopper arm having an end engaged with said defining means; and
   a center gear supported to said one of first and second frames, said center gear being meshed with said sector gear.

2. A seat lifter as claimed in claim 1, wherein said shaft is formed with an enlarged-diameter portion at an end thereof, said sector gear being engaged with said shaft to contact said enlarged-diameter portion.

3. A seat lifter as claimed in claim 2, wherein said enlarged-diameter portion of said shaft is obtained by bulging.

4. A seat lifter as claimed in claim 2, wherein said sector gear and said enlarged-diameter portion are connected by welding.

5. A seat lifter as claimed in claim 1, wherein said defining means include said first frame.

6. A seat lifter as claimed in claim 1, wherein said predetermined hole of said defining means is shaped in a long arc.

7. A seat lifter as claimed in claim 1, wherein said sector gear and said center gear have a tooth portion formed in a special theoretical tooth profile.

8. A seat lifter as claimed in claim 1, wherein said sector gear, said center gear, and said link are always biased by a dead weight of said second frame.

9. A seat lifter as claimed in claim 8, wherein the gear ratio of said center gear to said sector gear is 1 to 8–25.

10. A lifter for a seat comprising:
    first and second frames;
    a shaft arranged through a hole formed in one of said first and second frames, said shaft serving to vertically move said second frame with respect to said first frame through a link;
    a sector gear engaged with said shaft, said sector gear having a tooth portion formed in a special theoretical tooth profile; and
    a center gear supported to said one of first and second frames, said center gear having a tooth portion formed in a special theoretical tooth profile, said center gear being meshed with said sector gear,
    wherein the special tooth profiles of the center gear and the sector gear eliminate a need for an assist spring,
    wherein said sector gear, said center gear, and said link are always biased by a dead weight of said second frame, and
    wherein the gear ratio of said center gear to said sector gear is 1 to 8–25.

11. A lifter as claimed in claim 10, wherein said hole is arranged to correspond to a front portion of the seat.

12. A lifter for a seat comprising:
    first and second frames;
    a shaft arranged through a hole formed in one of the first and second frames, the hole being arranged to correspond to a front portion of the seat, the shaft serving to vertically move the second frame with respect to the first frame through a link;
    a sector gear engaged with the shaft, the sector gear having a tooth portion formed in a special theoretical tooth profile; and
    a center gear supported to the one frame, the center gear having a tooth portion formed in a special theoretical tooth profile, the center gear being meshed with the sector gear,
    wherein the special tooth profiles of the center gear and the sector gear eliminate a need for an assist spring,
    wherein the sector gear, the center gear, and the link are always biased by a dead weight of the second frame, and
    wherein the gear ratio of the center gear to the sector gear is 1 to 8–25.

* * * * *